(12) United States Patent
Telefus et al.

(10) Patent No.: US 12,348,028 B2
(45) Date of Patent: Jul. 1, 2025

(54) MULTI-OUTPUT PROGRAMMABLE POWER MANAGER

(71) Applicant: Amber Semiconductor, Inc., Dublin, CA (US)

(72) Inventors: Mark Telefus, Orinda, CA (US); Harry Rodriguez, San Jose, CA (US)

(73) Assignee: Amber Semiconductor, Inc., Dublin, CA (US)

( * ) Notice: Subject to any disclaimer, the term of this patent is extended or adjusted under 35 U.S.C. 154(b) by 82 days.

(21) Appl. No.: 17/972,589

(22) Filed: Oct. 25, 2022

(65) Prior Publication Data

US 2023/0127078 A1 Apr. 27, 2023

Related U.S. Application Data

(60) Provisional application No. 63/270,728, filed on Oct. 22, 2021.

(51) Int. Cl.
*H02M 1/00* (2007.01)
*H02J 1/08* (2006.01)

(52) U.S. Cl.
CPC ............ *H02J 1/082* (2020.01); *H02M 1/0067* (2021.05); *H02M 1/008* (2021.05)

(58) Field of Classification Search
CPC ....... H02M 1/008; H02M 1/0067; H02J 1/082
See application file for complete search history.

(56) References Cited

U.S. PATENT DOCUMENTS

| | | | |
|---|---|---|---|
| 3,638,102 A | 1/1972 | Pelka | |
| 3,777,253 A | 12/1973 | Callan | |
| 4,074,345 A | 2/1978 | Ackermann | |
| 4,127,895 A | 11/1978 | Krueger | |
| 4,245,148 A | 1/1981 | Gisske et al. | |
| 4,245,184 A | 1/1981 | Billings et al. | |
| 4,245,185 A | 1/1981 | Mitchell et al. | |
| 4,257,081 A | 3/1981 | Sauer et al. | |
| 4,466,071 A | 8/1984 | Russell, Jr. | |
| 4,487,458 A | 12/1984 | Janutka | |

(Continued)

FOREIGN PATENT DOCUMENTS

| | | |
|---|---|---|
| CN | 109075551 B | 1/2021 |
| DE | 19712261 A1 | 10/1998 |

(Continued)

OTHER PUBLICATIONS

F. Stajano et al., "The Resurrecting Duckling: Security Issues for Ad-hoc Wireless Networks," International Workshop on Security Protocols, 1999, 11 pages.

(Continued)

*Primary Examiner* — Harry R Behm

(74) *Attorney, Agent, or Firm* — Ryan, Mason & Lewis, LLP

(57) ABSTRACT

A system is provided which comprises a power converter circuit, a plurality of DC-DC converter circuits, and a controller. The power converter circuit is configured to convert an AC voltage to a DC voltage. The DC-DC converter circuits are configured to convert the DC voltage output from the power converter circuit into respective regulated DC voltages. The controller is configured to control and program operations of the DC-DC converter circuits.

10 Claims, 3 Drawing Sheets

(56) References Cited

U.S. PATENT DOCUMENTS

| | | |
|---|---|---|
| 4,581,540 A | 4/1986 | Guajardo |
| 4,631,625 A | 12/1986 | Alexander et al. |
| 4,636,907 A | 1/1987 | Howell |
| 4,649,302 A | 3/1987 | Damiano et al. |
| 4,653,084 A | 3/1987 | Ahuja |
| 4,682,061 A | 7/1987 | Donovan |
| 4,685,046 A | 8/1987 | Sanders |
| 4,709,296 A | 11/1987 | Hung et al. |
| 4,760,293 A | 7/1988 | Hebenstreit |
| 4,766,281 A | 8/1988 | Buhler |
| 4,812,995 A | 3/1989 | Girgis et al. |
| 4,888,504 A | 12/1989 | Kinzer |
| 4,945,345 A | 7/1990 | Proctor et al. |
| 5,121,282 A | 6/1992 | White |
| 5,161,107 A | 11/1992 | Mayeaux et al. |
| 5,276,737 A | 1/1994 | Micali |
| 5,307,257 A | 4/1994 | Fukushima |
| 5,371,646 A | 12/1994 | Biegelmeier |
| 5,410,745 A | 4/1995 | Friesen et al. |
| 5,559,656 A | 9/1996 | Chokhawala |
| 5,646,514 A | 7/1997 | Tsunetsugu |
| 5,654,880 A | 8/1997 | Brkovic et al. |
| 5,731,732 A | 3/1998 | Williams |
| 5,793,596 A | 8/1998 | Jordan et al. |
| 5,796,274 A | 8/1998 | Willis et al. |
| 5,844,759 A | 12/1998 | Hirsh et al. |
| 5,859,756 A | 1/1999 | Pressman et al. |
| 5,870,009 A | 2/1999 | Serpinet et al. |
| 5,933,305 A | 8/1999 | Schmalz et al. |
| 6,041,322 A | 3/2000 | Meng et al. |
| 6,081,123 A | 6/2000 | Kasbarian et al. |
| 6,111,494 A | 8/2000 | Fischer et al. |
| 6,115,267 A | 9/2000 | Herbert |
| 6,141,197 A | 10/2000 | Kim et al. |
| 6,160,689 A | 12/2000 | Stolzenberg |
| 6,167,329 A | 12/2000 | Engel et al. |
| 6,169,391 B1 | 1/2001 | Lei |
| 6,188,203 B1 | 2/2001 | Rice et al. |
| 6,300,748 B1 | 10/2001 | Miller |
| 6,369,554 B1 | 4/2002 | Aram |
| 6,483,290 B1 | 11/2002 | Hemminger et al. |
| 6,515,434 B1 | 2/2003 | Biebl |
| 6,538,906 B1 | 3/2003 | Ke et al. |
| 6,756,998 B1 | 6/2004 | Bilger |
| 6,788,512 B2 | 9/2004 | Vicente et al. |
| 6,807,035 B1 | 10/2004 | Baldwin et al. |
| 6,813,720 B2 | 11/2004 | Leblanc |
| 6,839,208 B2 | 1/2005 | Macbeth et al. |
| 6,843,680 B2 | 1/2005 | Gorman |
| 6,906,476 B1 | 6/2005 | Beatenbough et al. |
| 6,984,988 B2 | 1/2006 | Yamamoto |
| 7,045,723 B1 | 5/2006 | Projkovski |
| 7,053,626 B2 | 5/2006 | Monter et al. |
| 7,110,225 B1 | 9/2006 | Hick |
| 7,148,796 B2 | 12/2006 | Joy et al. |
| 7,164,238 B2 | 1/2007 | Kazanov et al. |
| 7,292,419 B1 | 11/2007 | Nemir |
| 7,297,603 B2 | 11/2007 | Robb et al. |
| 7,304,828 B1 | 12/2007 | Shvartsman |
| D558,683 S | 1/2008 | Pape et al. |
| 7,319,574 B2 | 1/2008 | Engel |
| D568,253 S | 5/2008 | Gorman |
| 7,367,121 B1 | 5/2008 | Gorman |
| 7,586,285 B2 | 9/2009 | Gunji |
| 7,595,680 B2 | 9/2009 | Morita et al. |
| 7,610,616 B2 | 10/2009 | Masuouka et al. |
| 7,633,727 B2 | 12/2009 | Zhou et al. |
| 7,643,256 B2 | 1/2010 | Wright et al. |
| 7,693,670 B2 | 4/2010 | Durling et al. |
| 7,715,216 B2 | 5/2010 | Liu et al. |
| 7,729,147 B1 | 6/2010 | Wong et al. |
| 7,731,403 B2 | 6/2010 | Lynam et al. |
| 7,746,677 B2 | 6/2010 | Unkrich |
| 7,821,023 B2 | 10/2010 | Yuan et al. |
| D638,355 S | 5/2011 | Chen |
| 7,936,279 B2 | 5/2011 | Tang et al. |
| 7,948,719 B2 | 5/2011 | Xu |
| 8,063,618 B2 * | 11/2011 | Lam ............... H02M 3/155 |
| | | 323/283 |
| 8,124,888 B2 | 2/2012 | Etemad-Moghadam et al. |
| 8,256,675 B2 | 9/2012 | Baglin et al. |
| 8,295,950 B1 | 10/2012 | Wordsworth et al. |
| 8,374,729 B2 | 2/2013 | Chapel et al. |
| 8,463,453 B2 | 6/2013 | Parsons, Jr. |
| 8,482,885 B2 | 7/2013 | Billingsley et al. |
| 8,560,134 B1 | 10/2013 | Lee |
| 8,649,883 B2 | 2/2014 | Lu et al. |
| 8,664,886 B2 | 3/2014 | Ostrovsky |
| 8,717,720 B2 | 5/2014 | DeBoer |
| 8,718,830 B2 | 5/2014 | Smith |
| 8,781,637 B2 | 7/2014 | Eaves |
| 8,817,441 B2 | 8/2014 | Callanan |
| 8,890,371 B2 | 11/2014 | Gotou |
| D720,295 S | 12/2014 | Dodal et al. |
| 8,947,838 B2 | 2/2015 | Yamai et al. |
| 9,054,587 B2 | 6/2015 | Neyman |
| 9,055,641 B2 | 6/2015 | Shteynberg et al. |
| 9,287,792 B2 | 3/2016 | Telefus et al. |
| 9,325,516 B2 | 4/2016 | Pera et al. |
| 9,366,702 B2 | 6/2016 | Steele et al. |
| 9,439,318 B2 | 9/2016 | Chen |
| 9,443,845 B1 | 9/2016 | Stafanov et al. |
| 9,502,832 B1 | 11/2016 | Ullahkhan et al. |
| 9,509,083 B2 | 11/2016 | Yang |
| 9,515,560 B1 | 12/2016 | Telefus et al. |
| 9,577,420 B2 | 2/2017 | Ostrovsky et al. |
| 9,621,053 B1 | 4/2017 | Telefus |
| 9,755,630 B2 | 9/2017 | Urciuoli |
| 9,774,182 B2 | 9/2017 | Phillips |
| 9,836,243 B1 | 12/2017 | Chanler et al. |
| 9,883,554 B2 | 1/2018 | Lynch |
| D814,424 S | 4/2018 | DeCosta |
| 9,965,007 B2 | 5/2018 | Amelio et al. |
| 9,990,786 B1 | 6/2018 | Ziraknejad |
| 9,991,633 B2 | 6/2018 | Robinet |
| 10,072,942 B2 | 9/2018 | Wootton et al. |
| 10,076,006 B2 | 9/2018 | Kahlman et al. |
| 10,101,716 B2 | 10/2018 | Kim |
| 10,186,027 B1 | 1/2019 | Hicken et al. |
| 10,187,944 B2 | 1/2019 | MacAdam et al. |
| 10,469,077 B2 | 11/2019 | Telefus et al. |
| 10,548,188 B2 | 1/2020 | Cheng et al. |
| D879,056 S | 3/2020 | Telefus |
| D881,144 S | 4/2020 | Telefus |
| 10,615,713 B2 | 4/2020 | Telefus et al. |
| 10,645,536 B1 | 5/2020 | Barnes et al. |
| 10,756,662 B2 | 8/2020 | Steiner et al. |
| 10,812,072 B2 | 10/2020 | Telefus et al. |
| 10,812,282 B2 | 10/2020 | Telefus et al. |
| 10,819,336 B2 | 10/2020 | Telefus et al. |
| 10,834,792 B2 | 11/2020 | Telefus et al. |
| 10,887,447 B2 | 1/2021 | Jakobsson et al. |
| 10,931,473 B2 | 2/2021 | Telefus et al. |
| 10,936,749 B2 | 3/2021 | Jakobsson |
| 10,951,435 B2 | 3/2021 | Jakobsson |
| 10,985,548 B2 | 4/2021 | Telefus |
| 10,992,236 B2 | 4/2021 | Telefus et al. |
| 10,993,082 B2 | 4/2021 | Jakobsson |
| 11,050,236 B2 | 6/2021 | Telefus et al. |
| 11,056,981 B2 | 7/2021 | Telefus |
| 11,064,586 B2 | 7/2021 | Telefus et al. |
| 11,114,947 B2 | 9/2021 | Telefus et al. |
| 11,170,964 B2 | 11/2021 | Telefus et al. |
| 11,197,153 B2 | 12/2021 | Jakobsson |
| 11,205,011 B2 | 12/2021 | Jakobsson et al. |
| 11,245,339 B2 | 2/2022 | Telefus et al. |
| 11,295,735 B1 | 4/2022 | Anuar et al. |
| 11,334,388 B2 | 5/2022 | Jakobsson |
| 11,336,096 B2 | 5/2022 | Jakobsson et al. |
| 11,336,199 B2 | 5/2022 | Telefus et al. |
| 11,342,151 B2 | 5/2022 | Telefus et al. |
| 11,342,735 B2 | 5/2022 | Telefus et al. |
| 11,348,752 B2 | 5/2022 | Telefus et al. |
| 11,349,296 B2 | 5/2022 | Telefus |

(56) References Cited

U.S. PATENT DOCUMENTS

| | | |
|---|---|---|
| 11,349,297 B2 | 5/2022 | Telefus et al. |
| 11,363,690 B2 | 6/2022 | Telefus et al. |
| 11,373,831 B2 | 6/2022 | Telefus et al. |
| 11,422,520 B2 | 8/2022 | Telefus et al. |
| 11,463,274 B2 | 10/2022 | Jakobsson |
| 11,477,209 B2 | 10/2022 | Jakobsson |
| 2002/0109487 A1 | 8/2002 | Telefus et al. |
| 2003/0052544 A1 | 3/2003 | Yamamoto et al. |
| 2003/0063420 A1 | 4/2003 | Pahl et al. |
| 2003/0151865 A1 | 8/2003 | Maio |
| 2004/0032756 A1 | 2/2004 | Van Den Bossche |
| 2004/0201279 A1* | 10/2004 | Templeton ............... H02J 1/001 307/11 |
| 2004/0251884 A1 | 12/2004 | Steffie et al. |
| 2005/0128657 A1 | 6/2005 | Covault |
| 2005/0162139 A1 | 7/2005 | Hirst |
| 2005/0185353 A1 | 8/2005 | Rasmussen et al. |
| 2005/0286184 A1 | 12/2005 | Campolo |
| 2006/0285366 A1 | 12/2006 | Radecker et al. |
| 2007/0008747 A1 | 1/2007 | Soldano et al. |
| 2007/0018506 A1 | 1/2007 | Paik et al. |
| 2007/0143826 A1 | 6/2007 | Sastry et al. |
| 2007/0159745 A1 | 7/2007 | Berberich et al. |
| 2007/0188025 A1 | 8/2007 | Keagy et al. |
| 2007/0217237 A1 | 9/2007 | Palestrina |
| 2007/0232347 A1 | 10/2007 | Persson et al. |
| 2007/0236152 A1 | 10/2007 | Davis et al. |
| 2008/0006607 A1 | 1/2008 | Boeder et al. |
| 2008/0072080 A1* | 3/2008 | Chapuis ................... G06F 1/26 713/300 |
| 2008/0074373 A1* | 3/2008 | Chapuis ................... G06F 1/30 345/89 |
| 2008/0136581 A1 | 6/2008 | Heilman et al. |
| 2008/0151444 A1 | 6/2008 | Upton |
| 2008/0174922 A1 | 7/2008 | Kimbrough |
| 2008/0180866 A1 | 7/2008 | Wong |
| 2008/0197699 A1 | 8/2008 | Yu et al. |
| 2008/0204950 A1 | 8/2008 | Zhou et al. |
| 2008/0234879 A1 | 9/2008 | Fuller et al. |
| 2008/0238488 A1* | 10/2008 | Comisky ............... G01R 31/40 327/20 |
| 2008/0246451 A1 | 10/2008 | Dobbins et al. |
| 2008/0253153 A1 | 10/2008 | Wu et al. |
| 2008/0281472 A1 | 11/2008 | Podgorny et al. |
| 2009/0034139 A1 | 2/2009 | Martin |
| 2009/0067201 A1 | 3/2009 | Cai |
| 2009/0168273 A1 | 7/2009 | Yu et al. |
| 2009/0195349 A1 | 8/2009 | Frader-Thompson et al. |
| 2009/0203355 A1 | 8/2009 | Clark |
| 2009/0213629 A1 | 8/2009 | Liu et al. |
| 2009/0284385 A1 | 11/2009 | Tang et al. |
| 2009/0296432 A1* | 12/2009 | Chapuis ................... H02J 1/08 363/65 |
| 2010/0013307 A1* | 1/2010 | Heineman ............... H02J 1/001 307/33 |
| 2010/0036903 A1 | 2/2010 | Ahmad et al. |
| 2010/0091418 A1 | 4/2010 | Xu |
| 2010/0145479 A1 | 6/2010 | Griffiths |
| 2010/0145542 A1 | 6/2010 | Chapel et al. |
| 2010/0156369 A1 | 6/2010 | Kularatna et al. |
| 2010/0188054 A1 | 7/2010 | Asakura et al. |
| 2010/0191487 A1 | 7/2010 | Rada et al. |
| 2010/0231135 A1 | 9/2010 | Hum et al. |
| 2010/0231373 A1 | 9/2010 | Romp |
| 2010/0235896 A1 | 9/2010 | Hirsch |
| 2010/0244730 A1 | 9/2010 | Nerone |
| 2010/0261373 A1 | 10/2010 | Roneker |
| 2010/0284207 A1 | 11/2010 | Watanabe et al. |
| 2010/0296207 A1 | 11/2010 | Schumacher et al. |
| 2010/0309003 A1 | 12/2010 | Rousseau |
| 2010/0320840 A1 | 12/2010 | Fridberg |
| 2011/0062936 A1 | 3/2011 | Bartelous |
| 2011/0068626 A1* | 3/2011 | Terlizzi ................... H02J 1/14 307/32 |
| 2011/0121752 A1 | 5/2011 | Newman, Jr. et al. |
| 2011/0127922 A1 | 6/2011 | Sauerlaender |
| 2011/0156610 A1 | 6/2011 | Ostrovsky et al. |
| 2011/0234000 A1* | 9/2011 | Yan ....................... H02M 3/157 307/31 |
| 2011/0273103 A1 | 11/2011 | Hong |
| 2011/0292703 A1 | 12/2011 | Cuk |
| 2011/0299547 A1 | 12/2011 | Diab et al. |
| 2011/0301894 A1 | 12/2011 | Sanderford, Jr. |
| 2011/0305054 A1 | 12/2011 | Yamagiwa et al. |
| 2011/0307447 A1 | 12/2011 | Sabaa et al. |
| 2012/0026632 A1 | 2/2012 | Acharya et al. |
| 2012/0075897 A1 | 3/2012 | Fujita |
| 2012/0080942 A1 | 4/2012 | Carralero et al. |
| 2012/0086416 A1* | 4/2012 | Kudo ..................... G06F 1/26 323/265 |
| 2012/0089266 A1 | 4/2012 | Tomimbang et al. |
| 2012/0095605 A1 | 4/2012 | Tran |
| 2012/0133289 A1 | 5/2012 | Hum et al. |
| 2012/0190386 A1 | 7/2012 | Anderson |
| 2012/0275076 A1 | 11/2012 | Shono |
| 2012/0311035 A1 | 12/2012 | Guha et al. |
| 2012/0323510 A1 | 12/2012 | Bell et al. |
| 2013/0026925 A1 | 1/2013 | Ven et al. |
| 2013/0051102 A1 | 2/2013 | Huang et al. |
| 2013/0057247 A1 | 3/2013 | Russell et al. |
| 2013/0063851 A1 | 3/2013 | Stevens et al. |
| 2013/0066478 A1 | 3/2013 | Smith |
| 2013/0088160 A1 | 4/2013 | Chai et al. |
| 2013/0104238 A1 | 4/2013 | Balsan et al. |
| 2013/0119958 A1 | 5/2013 | Gasperi |
| 2013/0128396 A1 | 5/2013 | Danesh et al. |
| 2013/0170261 A1 | 7/2013 | Lee et al. |
| 2013/0174211 A1 | 7/2013 | Aad et al. |
| 2013/0187631 A1 | 7/2013 | Russell et al. |
| 2013/0245841 A1 | 9/2013 | Ahn et al. |
| 2013/0253898 A1 | 9/2013 | Meagher et al. |
| 2013/0261821 A1 | 10/2013 | Lu et al. |
| 2013/0265041 A1 | 10/2013 | Friedrich et al. |
| 2013/0300534 A1 | 11/2013 | Myllymaki |
| 2013/0313712 A1* | 11/2013 | Otremba ........... H01L 23/49861 257/773 |
| 2013/0329331 A1 | 12/2013 | Erger et al. |
| 2014/0043732 A1 | 2/2014 | McKay et al. |
| 2014/0067137 A1 | 3/2014 | Amelio et al. |
| 2014/0074730 A1 | 3/2014 | Arensmeier et al. |
| 2014/0085940 A1 | 3/2014 | Lee et al. |
| 2014/0096272 A1 | 4/2014 | Makofsky et al. |
| 2014/0097809 A1 | 4/2014 | Follic et al. |
| 2014/0159593 A1 | 6/2014 | Chu et al. |
| 2014/0164294 A1 | 6/2014 | Osann, Jr. |
| 2014/0203718 A1 | 7/2014 | Yoon et al. |
| 2014/0246926 A1 | 9/2014 | Cruz et al. |
| 2014/0266698 A1 | 9/2014 | Hall et al. |
| 2014/0268935 A1 | 9/2014 | Chiang |
| 2014/0276753 A1 | 9/2014 | Wham et al. |
| 2014/0331278 A1 | 11/2014 | Tkachev |
| 2014/0357228 A1 | 12/2014 | Luft et al. |
| 2014/0365490 A1 | 12/2014 | Yang et al. |
| 2015/0019726 A1 | 1/2015 | Zhou et al. |
| 2015/0042274 A1 | 2/2015 | Kim et al. |
| 2015/0055261 A1 | 2/2015 | Lubicki et al. |
| 2015/0097430 A1 | 4/2015 | Scruggs |
| 2015/0116886 A1 | 4/2015 | Zehnder et al. |
| 2015/0154404 A1 | 6/2015 | Patel et al. |
| 2015/0155789 A1 | 6/2015 | Freeman et al. |
| 2015/0180469 A1 | 6/2015 | Kim |
| 2015/0185261 A1 | 7/2015 | Frader-Thompson et al. |
| 2015/0185262 A1 | 7/2015 | Song et al. |
| 2015/0216006 A1 | 7/2015 | Lee et al. |
| 2015/0221151 A1 | 8/2015 | Bacco et al. |
| 2015/0236587 A1 | 8/2015 | Kim et al. |
| 2015/0253364 A1 | 9/2015 | Hieda et al. |
| 2015/0256355 A1 | 9/2015 | Pera et al. |
| 2015/0256665 A1 | 9/2015 | Pera et al. |
| 2015/0282223 A1 | 10/2015 | Wang et al. |
| 2015/0309521 A1 | 10/2015 | Pan |
| 2015/0317326 A1 | 11/2015 | Bandarupalli et al. |
| 2015/0355649 A1 | 12/2015 | Ovadia |

(56) References Cited

U.S. PATENT DOCUMENTS

| | | |
|---|---|---|
| 2015/0362927 A1 | 12/2015 | Giorgi |
| 2015/0363563 A1 | 12/2015 | Hallwachs |
| 2015/0382153 A1 | 12/2015 | Otis et al. |
| 2016/0012699 A1 | 1/2016 | Lundy |
| 2016/0018800 A1 | 1/2016 | Gettings et al. |
| 2016/0035159 A1 | 2/2016 | Ganapathy Achari et al. |
| 2016/0050530 A1 | 2/2016 | Corbalis et al. |
| 2016/0057841 A1 | 2/2016 | Lenig |
| 2016/0069933 A1 | 3/2016 | Cook et al. |
| 2016/0077746 A1 | 3/2016 | Muth et al. |
| 2016/0081143 A1 | 3/2016 | Wang |
| 2016/0095099 A1 | 3/2016 | Yang et al. |
| 2016/0105814 A1 | 4/2016 | Hurst et al. |
| 2016/0110154 A1 | 4/2016 | Qureshi et al. |
| 2016/0117917 A1 | 4/2016 | Prakash et al. |
| 2016/0126031 A1 | 5/2016 | Wootton et al. |
| 2016/0156635 A1 | 6/2016 | Liu et al. |
| 2016/0157193 A1 | 6/2016 | Qi et al. |
| 2016/0178691 A1 | 6/2016 | Simonin |
| 2016/0181941 A1 | 6/2016 | Gratton et al. |
| 2016/0195864 A1 | 7/2016 | Kim |
| 2016/0232318 A1 | 8/2016 | Mensinger et al. |
| 2016/0247799 A1 | 8/2016 | Stafanov et al. |
| 2016/0259308 A1 | 9/2016 | Fadell et al. |
| 2016/0260135 A1 | 9/2016 | Zomet et al. |
| 2016/0274864 A1 | 9/2016 | Zomet et al. |
| 2016/0277528 A1 | 9/2016 | Guilaume et al. |
| 2016/0294179 A1 | 10/2016 | Kennedy et al. |
| 2016/0343083 A1 | 11/2016 | Hering et al. |
| 2016/0360586 A1 | 12/2016 | Yang et al. |
| 2016/0374134 A1 | 12/2016 | Kweon et al. |
| 2017/0004948 A1 | 1/2017 | Leyh |
| 2017/0019969 A1 | 1/2017 | O'Neil et al. |
| 2017/0026194 A1 | 1/2017 | Vijayrao et al. |
| 2017/0033942 A1 | 2/2017 | Koeninger |
| 2017/0063225 A1 | 3/2017 | Guo et al. |
| 2017/0067961 A1 | 3/2017 | O'Flynn |
| 2017/0086281 A1 | 3/2017 | Avrahamy |
| 2017/0099647 A1 | 4/2017 | Shah et al. |
| 2017/0104325 A1 | 4/2017 | Eriksen et al. |
| 2017/0134883 A1 | 5/2017 | Lekutai |
| 2017/0168516 A1 | 6/2017 | King |
| 2017/0170730 A1 | 6/2017 | Sugiura |
| 2017/0171802 A1 | 6/2017 | Hou et al. |
| 2017/0179946 A1 | 6/2017 | Turvey |
| 2017/0195130 A1 | 7/2017 | Landow et al. |
| 2017/0212653 A1 | 7/2017 | Kanojia et al. |
| 2017/0214967 A1 | 7/2017 | Xia et al. |
| 2017/0230193 A1 | 8/2017 | Apte et al. |
| 2017/0230939 A1 | 8/2017 | Rudolf et al. |
| 2017/0244241 A1 | 8/2017 | Wilson et al. |
| 2017/0251014 A1 | 8/2017 | Eisen |
| 2017/0256934 A1 | 9/2017 | Kennedy et al. |
| 2017/0256941 A1 | 9/2017 | Bowers et al. |
| 2017/0256956 A1 | 9/2017 | Irish et al. |
| 2017/0265287 A1 | 9/2017 | Avrahamy |
| 2017/0277709 A1 | 9/2017 | Strauss et al. |
| 2017/0314743 A1 | 11/2017 | Del Castillo et al. |
| 2017/0318098 A1 | 11/2017 | Sanghvi et al. |
| 2017/0322049 A1 | 11/2017 | Wootton et al. |
| 2017/0322258 A1 | 11/2017 | Miller et al. |
| 2017/0338809 A1 | 11/2017 | Stefanov et al. |
| 2017/0347415 A1 | 11/2017 | Cho et al. |
| 2017/0366950 A1 | 12/2017 | Arbon |
| 2017/0372159 A1 | 12/2017 | Schimmel |
| 2018/0026534 A1 | 1/2018 | Turcan |
| 2018/0054460 A1 | 2/2018 | Brady et al. |
| 2018/0054862 A1 | 2/2018 | Takagimoto et al. |
| 2018/0061158 A1 | 3/2018 | Greene |
| 2018/0091361 A1 | 3/2018 | Smith et al. |
| 2018/0146369 A1 | 5/2018 | Kennedy, Jr. |
| 2018/0174076 A1 | 6/2018 | Fukami |
| 2018/0183685 A1 | 6/2018 | Cook |
| 2018/0196094 A1 | 7/2018 | Fishburn et al. |
| 2018/0201302 A1 | 7/2018 | Sonoda et al. |
| 2018/0254959 A1 | 9/2018 | Mantyjarvi et al. |
| 2018/0285198 A1 | 10/2018 | Dantkale et al. |
| 2018/0287802 A1 | 10/2018 | Brickell |
| 2018/0301006 A1 | 10/2018 | Flint et al. |
| 2018/0307609 A1 | 10/2018 | Qiang et al. |
| 2018/0307859 A1 | 10/2018 | LaFever et al. |
| 2018/0342329 A1 | 11/2018 | Rufo et al. |
| 2018/0351342 A1 | 12/2018 | Anderson et al. |
| 2018/0359039 A1 | 12/2018 | Daoura et al. |
| 2018/0359223 A1 | 12/2018 | Maier et al. |
| 2019/0003855 A1 | 1/2019 | Wootton et al. |
| 2019/0020477 A1 | 1/2019 | Antonatos et al. |
| 2019/0026493 A1 | 1/2019 | Ukena-Bonfig et al. |
| 2019/0028869 A1 | 1/2019 | Kaliner |
| 2019/0036928 A1 | 1/2019 | Meriac et al. |
| 2019/0050903 A1 | 2/2019 | DeWitt et al. |
| 2019/0052174 A1 | 2/2019 | Gong |
| 2019/0068716 A1 | 2/2019 | Lauer |
| 2019/0086979 A1 | 3/2019 | Kao et al. |
| 2019/0087835 A1 | 3/2019 | Schwed et al. |
| 2019/0104138 A1 | 4/2019 | Storms et al. |
| 2019/0122834 A1 | 4/2019 | Wootton et al. |
| 2019/0140640 A1 | 5/2019 | Telefus et al. |
| 2019/0148931 A1 | 5/2019 | Li |
| 2019/0165691 A1 | 5/2019 | Telefus et al. |
| 2019/0181679 A1 | 6/2019 | Northway et al. |
| 2019/0182617 A1 | 6/2019 | Zamber et al. |
| 2019/0207375 A1 | 7/2019 | Telefus et al. |
| 2019/0222058 A1 | 7/2019 | Sharifipour |
| 2019/0238060 A1 | 8/2019 | Telefus et al. |
| 2019/0245457 A1 | 8/2019 | Telefus et al. |
| 2019/0253243 A1 | 8/2019 | Zimmerman et al. |
| 2019/0268176 A1 | 8/2019 | Pognant |
| 2019/0280887 A1 | 9/2019 | Telefus et al. |
| 2019/0306953 A1 | 10/2019 | Joyce et al. |
| 2019/0334999 A1 | 10/2019 | Ryhorchuk et al. |
| 2019/0355014 A1 | 11/2019 | Gerber |
| 2019/0362101 A1 | 11/2019 | Fisse et al. |
| 2019/0372331 A1 | 12/2019 | Liu et al. |
| 2020/0007126 A1 | 1/2020 | Telefus et al. |
| 2020/0014301 A1 | 1/2020 | Telefus |
| 2020/0014379 A1 | 1/2020 | Telefus |
| 2020/0044883 A1 | 2/2020 | Telefus et al. |
| 2020/0052607 A1 | 2/2020 | Telefus et al. |
| 2020/0053100 A1 | 2/2020 | Jakobsson |
| 2020/0106259 A1 | 4/2020 | Telefus |
| 2020/0106260 A1 | 4/2020 | Telefus |
| 2020/0106637 A1 | 4/2020 | Jakobsson |
| 2020/0120202 A1 | 4/2020 | Jakobsson et al. |
| 2020/0145247 A1 | 5/2020 | Jakobsson |
| 2020/0153245 A1 | 5/2020 | Jakobsson et al. |
| 2020/0159960 A1 | 5/2020 | Jakobsson |
| 2020/0193785 A1 | 6/2020 | Berglund et al. |
| 2020/0196110 A1 | 6/2020 | Jakobsson |
| 2020/0196412 A1 | 6/2020 | Telefus et al. |
| 2020/0200851 A1 | 6/2020 | Homsky et al. |
| 2020/0252299 A1 | 8/2020 | Kaag et al. |
| 2020/0260287 A1 | 8/2020 | Hendel |
| 2020/0275266 A1 | 8/2020 | Jakobsson |
| 2020/0287537 A1 | 9/2020 | Telefus et al. |
| 2020/0314233 A1 | 10/2020 | Mohalik et al. |
| 2020/0328694 A1 | 10/2020 | Telefus et al. |
| 2020/0344596 A1 | 10/2020 | Dong et al. |
| 2020/0365345 A1 | 11/2020 | Telefus et al. |
| 2020/0365346 A1 | 11/2020 | Telefus et al. |
| 2020/0365356 A1 | 11/2020 | Telefus et al. |
| 2020/0366078 A1 | 11/2020 | Telefus et al. |
| 2020/0366079 A1 | 11/2020 | Telefus et al. |
| 2020/0394332 A1 | 12/2020 | Jakobsson et al. |
| 2021/0014947 A1 | 1/2021 | Telefus et al. |
| 2021/0119528 A1 | 4/2021 | Telefus |
| 2021/0173364 A1 | 6/2021 | Telefus et al. |
| 2021/0182111 A1 | 6/2021 | Jakobsson |
| 2021/0185035 A1 | 6/2021 | Fernandez Yu |
| 2021/0226441 A1 | 7/2021 | Telefus et al. |
| 2021/0234356 A1 | 7/2021 | Telefus et al. |
| 2021/0336555 A1 | 10/2021 | Telefus |
| 2021/0345462 A1 | 11/2021 | Telefus et al. |
| 2022/0052533 A1 | 2/2022 | Telefus et al. |

(56) References Cited

U.S. PATENT DOCUMENTS

| | | | |
|---|---|---|---|
| 2022/0189721 | A1 | 6/2022 | Telefus et al. |
| 2022/0255310 | A1 | 8/2022 | Telefus |
| 2022/0311350 | A1 | 9/2022 | Telefus |

FOREIGN PATENT DOCUMENTS

| | | | |
|---|---|---|---|
| EP | 0016646 | A1 | 10/1980 |
| EP | 0398026 | A2 | 11/1990 |
| EP | 2560063 | A1 | 2/2013 |
| GB | 1302357 | A | 1/1973 |
| GB | 2458699 | A | 9/2009 |
| JP | 06-053779 | A | 2/1994 |
| JP | 2012244716 | A | 12/2012 |
| JP | 2013230034 | A | 11/2013 |
| JP | 2014030355 | A | 2/2014 |
| JP | 6997105 | B2 | 1/2022 |
| WO | 2010110951 | A1 | 9/2010 |
| WO | 2016010529 | A1 | 1/2016 |
| WO | 2016105505 | A1 | 6/2016 |
| WO | 2016110833 | A2 | 7/2016 |
| WO | 2017196571 | A1 | 11/2017 |
| WO | 2017196572 | A1 | 11/2017 |
| WO | 2017196649 | A1 | 11/2017 |
| WO | 2018075726 | A1 | 4/2018 |
| WO | 2018080604 | A1 | 5/2018 |
| WO | 2018080614 | A1 | 5/2018 |
| WO | 2018081619 | A2 | 5/2018 |
| WO | 2018081619 | A3 | 5/2018 |
| WO | 2018159914 | A1 | 9/2018 |
| WO | 2019133110 | A1 | 7/2019 |
| WO | 2020014158 | A1 | 1/2020 |
| WO | 2020014161 | A1 | 1/2020 |
| WO | PCT/US19/54102 | | 2/2020 |
| WO | 2020072516 | A1 | 4/2020 |
| WO | PCT/US19/67004 | | 4/2020 |
| WO | 2020131977 | A1 | 6/2020 |
| WO | PCT/US20/33421 | | 9/2020 |
| WO | 2020236726 | A1 | 11/2020 |
| WO | PCT/US21/14320 | | 4/2021 |
| WO | 2021112870 | A1 | 6/2021 |
| WO | 2021150684 | A1 | 7/2021 |
| WO | 2021183172 | A1 | 9/2021 |
| WO | PCT/US21/45624 | | 11/2021 |

OTHER PUBLICATIONS

L. Sweeney, "Simple Demographics Often Identify People Uniquely," Carnegie Mellon University, Data Privacy Working Paper 3, 2000, 34 pages.
A. Narayanan et al., "Robust De-anonymization of Large Sparse Datasets," IEEE Symposium on Security and Privacy, May 2008, 15 pages.
M. Alahmad et al., "Non-Intrusive Electrical Load Monitoring and Profiling Methods for Applications in Energy Management Systems," IEEE Long Island Systems, Applications and Technology Conference, 2011, 7 pages.
K. Yang et al. "Series Arc Fault Detection Algorithm Based on Autoregressive Bispecturm Analysis," Algorithms, vol. 8, Oct. 16, 2015, pp. 929-950.
J.-E. Park et al., "Design on Topologies for High Efficiency Two-Stage AC-DC Converter," 2012 IEEE 7th International Power Electronics and Motion Control Conference—ECCE Asia, Jun. 2-5, 2012, China, 6 pages.
S. Cuk, "98% Efficient Single-Stage AC/DC Converter Topologies," Power Electronics Europe, Issue 4, 2011, 6 pages.
E. Carvou et al., "Electrical Arc Characterization for Ac-Arc Fault Applications," 2009 Proceedings of the 55th IEEE Holm Conference on Electrical Contacts, IEEE Explore Oct. 9, 2009, 6 pages.
C. Restrepo, "Arc Fault Detection and Discrimination Methods," 2007 Proceedings of the 53rd IEEE Holm Conference on Electrical Contacts, IEEE Explore Sep. 24, 2007, 8 pages.
K. Eguchi et al., "Design of a Charge-Pump Type AC-DC Converter for RF-ID Tags," 2006 International Symposium on Communications and Information Technologies, F4D-3, IEEE, 2006, 4 pages.
A. Ayari et al., "Active Power Measurement Comparison Between Analog and Digital Methods," International Conference on Electrical Engineering and Software Applications, 2013, 6 pages.
G. D. Gregory et al., "The Arc-Fault Circuit Interrupter, an Emerging Product," IEEE, 1998, 8 pages.
D. Irwin et al., "Exploiting Home Automation Protocols for Load Monitoring in Smart Buildings," BuildSys '11: Proceedings of the Third ACM Workshop on Embedded Sensing Systems for Energy-Efficiency in Buildings, Nov. 2011, 6 pages.
B. Mrazovac et al., "Towards Ubiquitous Smart Outlets for Safety and Energetic Efficiency of Home Electric Appliances," 2011 IEEE International Conference on Consumer Electronics, Berlin, German, Sep. 6-8, 2011, 5 pages.
J. K. Becker et al., "Tracking Anonymized Bluetooth Devices," Proceedings on Privacy Enhancing Technologies, vol. 3, 2019, pp. 50-65.
H. Siadati et al., "Mind your SMSes: Mitigating Social Engineering in Second Factor Authentication," Computers & Security, vol. 65, Mar. 2017, 12 pages.
S. Jerde, "The New York Times Can Now Predict Your Emotions and Motivations After Reading a Story," https://www.adweek.com/tv-video/the-new-york-times-can-now-predict-your-emotions-and-motivations-after-reading-a-story/, Apr. 29, 2019, 3 pages.
K. Mowery et al., "Pixel Perfect: Fingerprinting Canvas in HTML5," Proceedings of W2SP, 2012, 12 pages.
S. Kamkar, "Evercookie," https://samy.pl/evercookie/, Oct. 11, 2010, 5 pages.
M. K. Franklin et al., "Fair Exchange with a Semi-Trusted Third Party," Association for Computing Machinery, 1997, 6 pages.
J. Camenisch et al., "Digital Payment Systems with Passive Anonymity-Revoking Trustees," Journal of Computer Security, vol. 5, No. 1, 1997, 11 pages.
L. Coney et al., "Towards a Privacy Measurement Criterion for Voting Systems," Proceedings of the 2005 National Conference on Digital Government Research, 2005, 2 pages.
L. Sweeney, "κ-anonymity: A Model for Protecting Privacy," International Journal of Uncertainty, Fuzziness and Knowledge-Based Systems, vol. 1, No. 5, 2002, 14 pages.
C. Dwork, "Differential Privacy," Encyclopedia of Cryptography and Security, 2011, 12 pages.
A. P. Felt et al., "Android Permissions: User Attention, Comprehension, and Behavior," Symposium on Usable Privacy and Security, Jul. 11-13, 2012, 14 pages.
S. Von Solms et al., "On Blind Signatures and Perfect Crimes," Computers & Security, vol. 11, No. 6, 1992, 3 pages.
R. Wyden, "Wyden Releases Discussion Draft of Legislation to Provide Real Protections for Americans' Privacy," https://www.wyden.senate.gov/news/press-releases/wyden-releases-discussion-draft-of-legislation-to-provide-real-protections-for-americans-privacy, Nov. 1, 2018, 3 pages.
M. Rubio, "Rubio Introduces Privacy Bill to Protect Consumers While Promoting Innovation," https://www.rubio.senate.gov/public/index.cfm/2019/1/rubio-introduces-privacy-bill-to-protect-consumers-while-promoting-innovation#:%7E:text=Washingt%E2%80%A6, Jan. 16, 2019, 2 pages.
C. Dwork et al., "Differential Privacy and Robust Statistics," 41st ACM Symposium on Theory of Computing, 2009, 10 pages.
J. Camenisch et al., "Compact E-Cash," Eurocrypt, vol. 3494, 2005, pp. 302-321.
D. L. Chaum, "Untraceable Electronic Mail, Return Addresses, and Digital Pseudonyms," Communications of the ACM, vol. 24, No. 2, Feb. 1981, pp. 84-88.
J. Camenisch et al., "An Efficient System for Nontransferable Anonymous Credentials With Optional Anonymity Revocation," International Conference on the Theory and Application of Cryptographic Techniques, May 6-10, 2001, 30 pages.
M. K. Reiter et al., "Crowds: Anonymity for Web Transactions," ACM Transactions on Information and System Security, vol. 1, 1997, 23 pages.

(56) References Cited

OTHER PUBLICATIONS

I. Clarke et al., "Freenet: A Distributed Anonymous Information Storage and Retrieval System," International Workshop on Designing Privacy Enhanching Technologies: Design Issues in Anonymity and Unobservability, 2001, 21 pages.
P. Golle et al., "Universal Re-encryption for Mixnets," Lecture Notes in Computer Science, Feb. 2004, 15 pages.
Y. Lindell et al., "Multiparty Computation for Privacy Preserving Data Mining," Journal of Privacy and Confidentiality, May 6, 2008, 39 pages.
J. Hollan et al., "Distributed Cognition: Toward a New Foundation for Human-Computer Interaction Research," ACM Transactions on Computer-Human Interaction, vol. 7, No. 2, Jun. 2000, pp. 174-196.
A. Adams et al., "Users are Not the Enemy," Communications of the ACM, Dec. 1999, 6 pages.
A. Morton et al., "Privacy is a Process, Not a Pet: a Theory for Effective Privacy Practice," Proceedings of the 2012 New Security Paradigms Workshop, Sep. 2012, 18 pages.
G. D. Abowd et al., "Charting Past, Present and Future Research in Ubiquitous Computing," ACM Transactions on Computer-Human Interaction, vol. 7, No. 1, Mar. 2000, pp. 29-58.
W. Mason et al., "Conducting Behavioral Research on Amazon's Mechanical Turk," Behavior Research Methods, Jun. 2011, 23 pages.
G. M. Gray et al., "Dealing with the Dangers of Fear: The Role of Risk Communication," Health Affairs, Nov. 2002, 11 pages.
L. Shengyuan et al., "Instantaneous Value Sampling AC-DC Converter and its Application in Power Quantity Detection," 2011 Third International Conference on Measuring Technology and Mechatronics Automation, Jan. 6-7, 2011, 4 pages.
H.-H. Chang et al., "Load Recognition for Different Loads with the Same Real Power and Reactive Power in a Non-intrusive Load-monitoring System," 2008 12th International Conference on Computer Supported Cooperative Work in Design, Apr. 16-18, 2008, 6 pages.
U.S. Appl. No. 17/660,785 filed in the name of Mark Telefus et al. entitled "Solid-State Ground-Fault Circuit Interrupter."
U.S. Appl. No. 17/904,437 filed in the name of Mark Telefus on Aug. 17, 2022, and entitled "AC to DC Converter."
U.S. Appl. No. 17/930,597 filed in the name of Mark Telefus and entitled "AC to DC Converter on a Chip."
U.S. Appl. No. 17/958,319 filed in the name of Damon Matthew Baker on Sep. 30, 2022, and entitled "Intelligent Electrical Switches."
U.S. Appl. No. 63/303,492 filed in the name of Damon Matthew Baker et al. on Jan. 26, 2022, and entitled "Zero-Current Crossing Detection in Inductive Loads."
U.S. Appl. No. 63/356,317 filed in the name of Mark Telefus et al. on Jun. 28, 2022, and entitled "FET-Based AC-to-DC Converter with Negative Cycle Gate Pre-Charge."
U.S. Appl. No. 63/402,058 filed in the name of Mark Telefus et al. on Aug. 29, 2022, and entitled "Thermal-Mechanical Framework for Solid-State Circuit Breaker."

* cited by examiner

MULTI-OUTPUT PROGRAMMABLE POWER MANAGER

CROSS-REFERENCE TO RELATED APPLICATION

This application claims the benefit of U.S. Provisional Application Ser. No. 63/270,728, filed on Oct. 22, 2021, the disclosure of which is fully incorporated herein by reference.

BACKGROUND

This disclosure relates generally to systems and methods for generating and managing the supply of direct current (DC) power for electronic components. The generation and distribution of DC power for integrated circuits chips and electronic components on a package substrate or printed circuit board, etc., can be challenging. For example, it can be difficult to implement a DC power supply system that delivers the required power to electronic components in instances where different electronic components require a different operating DC supply voltages and where the power requirement of a given electronic system or device can dynamically vary over time. In addition, certain electronic devices, such as high-performance central processing unit (CPU) devices and field programmable gate array (FPGA) may require a point-of-load DC-DC converter to be placed in close proximity to such devices to achieve proximity to power and thereby improve voltage accuracy, efficiency, and the dynamic response (e.g., dynamic changes in DC current draw over time) of the DC voltage rail which supplies DC power to such devices. Indeed, many digital systems operate at high current and low voltages, increasing the need to minimize the distance from power supply to load to reduce the effect of trace-induced voltage drops and parasitic inductance.

SUMMARY

Exemplary embodiments of the disclosure include systems and methods for generating and managing regulated direct current (DC) power and, in particular, systems and methods for direct conversion of alternating current (AC) power into multiple regulated DC voltages and for enabling a programmatic control and adjustment of the DC regulated voltage levels and power output.

An exemplary embodiment includes a system which comprises a power converter circuit, a plurality of DC-DC converter circuits, and a controller. The power converter circuit is configured to convert an AC voltage to a DC voltage. The DC-DC converter circuits are configured to convert the DC voltage output from the power converter circuit into respective regulated DC voltages. The controller is configured to control and program operations of the DC-DC converter circuits.

Other embodiments will be described in the following detailed description of exemplary embodiments, which is to be read in conjunction with the accompanying figures.

DETAILED DESCRIPTION

Embodiments of the disclosure will now be described in further detail with regard to multi-output programmable power management systems and methods which are configured to generate multiple DC regulated voltages directly from alternating current (AC) power and for programmatically adjusting the DC regulated voltage levels and power output. It is to be understood that the various features shown in the accompanying drawings are schematic illustrations that are not drawn to scale. Moreover, the same or similar reference numbers are used throughout the drawings to denote the same or similar features, elements, or structures, and thus, a detailed explanation of the same or similar features, elements, or structures will not be repeated for each of the drawings. Further, the term "exemplary" as used herein means "serving as an example, instance, or illustration." Any embodiment or design described herein as "exemplary" is not to be construed as preferred or advantageous over other embodiments or designs.

Further, it is to be understood that the phrase "configured to" as used in conjunction with a circuit, structure, element, component, or the like, performing one or more functions or otherwise providing some functionality, is intended to encompass embodiments wherein the circuit, structure, element, component, or the like, is implemented in hardware, software, and/or combinations thereof, and in implementations that comprise hardware, wherein the hardware may comprise discrete circuit elements (e.g., transistors, inverters, etc.), programmable elements (e.g., application specific integrated circuit (ASIC) chips, field-programmable gate array (FPGA) chips, etc.), processing devices (e.g., central processing units (CPUs), graphics processing units (GPUs), etc.), one or more integrated circuits, and/or combinations thereof. Thus, by way of example only, when a circuit, structure, element, component, etc., is defined to be configured to provide a specific functionality, it is intended to cover, but not be limited to, embodiments where the circuit, structure, element, component, etc., is comprised of elements, processing devices, and/or integrated circuits that enable it to perform the specific functionality when in an operational state (e.g., connected or otherwise deployed in a system, powered on, receiving an input, and/or producing an output), as well as cover embodiments when the circuit, structure, element, component, etc., is in a non-operational state (e.g., not connected nor otherwise deployed in a system, not powered on, not receiving an input, and/or not producing an output) or in a partial operational state.

Figure 1:
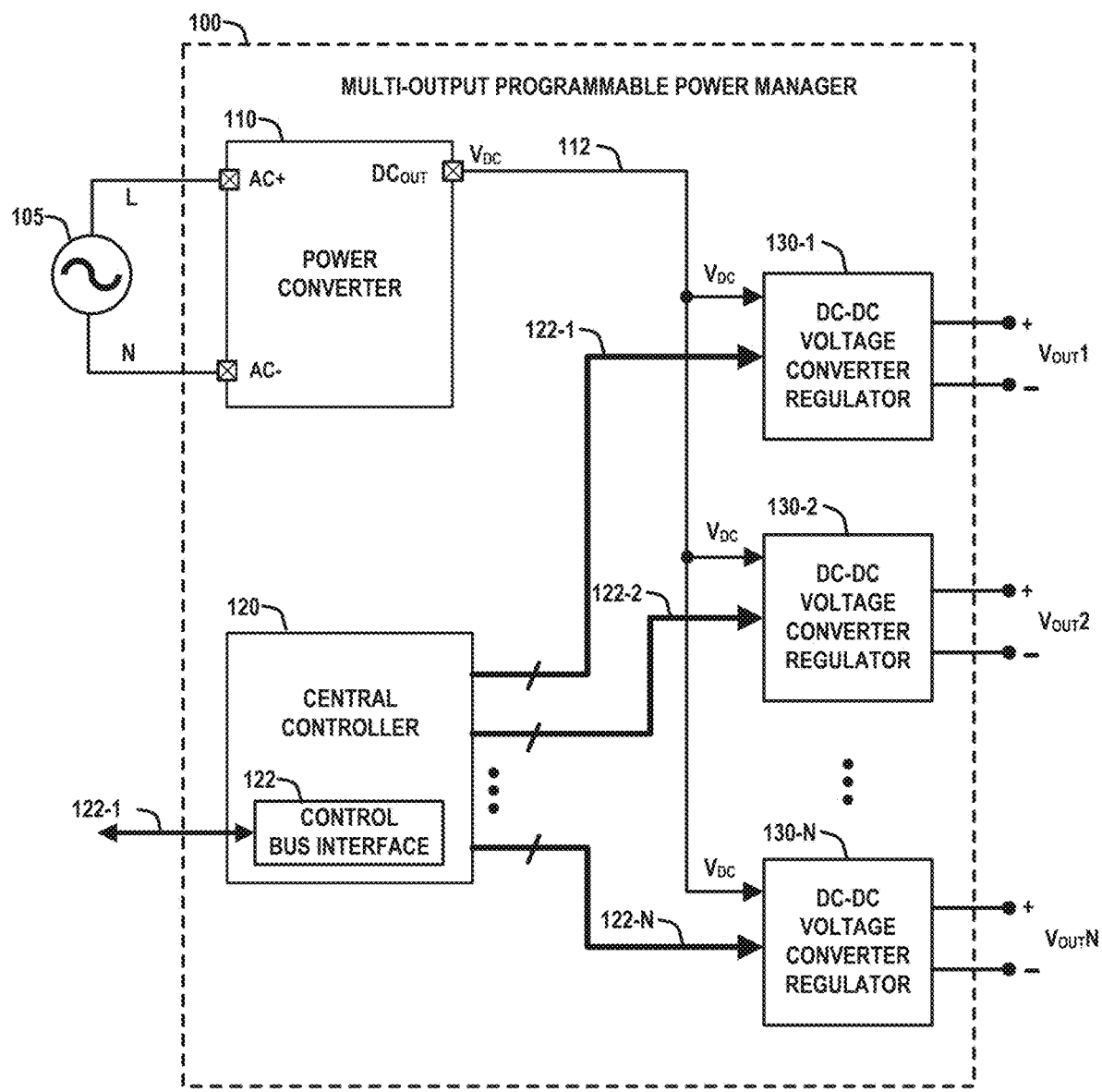
FIG. 1 schematically illustrates a multi-output programmable power management system, according to an exemplary embodiment of the disclosure.

FIG. 1 schematically illustrates a multi-output programmable power management system, according to an exemplary embodiment of the disclosure. In particular, FIG. 1 schematically illustrates a multi-output programmable power management system 100 (alternatively referred to as power management system 100) comprising a power converter circuit 110, a central controller 120, and a plurality (N) of DC-DC voltage converter and regulator circuits 130-1, 130-2, . . . , 130-N. The central controller 120 comprises a control bus interface 122 which is coupled to a control bus 122-1. In some embodiments, the central controller 120 comprises a central processing unit (CPU) or microcontroller, etc., which is configured to perform various power management functions as described herein. More specifically, in some embodiments, the central controller 120 comprises a programmable controller CPU which comprises embedded control modules to perform various control tasks as discussed herein. The central controller 120 is coupled to the DC-DC voltage converter and regulator circuits 130-1, 130-2, . . . , 130-N by respective control buses 122-1, 122-2, . . . , 122-N.

The power converter circuit 110 comprises an AC-to-DC converter circuit which is configured to convert AC power-supplied from an AC power source 105 into a DC voltage ($V_{DC}$). The power converter circuit 110 comprises AC input nodes AC+ and AC−, and a DC output node $DC_{OUT}$ which outputs the DC voltage, $V_{DC}$, that is applied to an input node of each DC-DC voltage converter and regulator circuit 130-1, 130-2, . . . , 130-N via a DC voltage distribution bus 112. In an exemplary non-limiting embodiment, the AC power source 106 comprises an AC mains which provides utility AC power, e.g., 120 Vrms (with a positive peak voltage of about 170V and a negative peak voltage of about −170V) at a frequency of 60 Hz. The AC input node AC+ is coupled to a hot line (L) of the AC mains supply 105, and the AC input node AC− is coupled to a neutral line (N), which is a grounded conductor of the AC mains supply 105. In some embodiments, the power converter circuit 110 is configured, for example, to generate the DC voltage $V_{DC}$=12 V or greater, wherein $V_{DC}$ is distributed to an input of each DC-DC voltage converter and regulator circuit 130-1, 130-2, . . . , 130-N over the DC voltage buss 112. It is to be understood that the power converter circuit 110 (and other power converter circuits as discussed below) can be implemented using any solid-state AC-to-DC converter circuit topology which is suitable for the given application.

In some embodiments, some or all of the DC-DC voltage converter and regulator circuits 130-1, 130-2, . . . , 130-N comprise a DC-DC step-down voltage switching regulator circuit (e.g., a Buck switching regulator) to convert the input DC voltage, $V_{DC}$, into respective regulated output voltages $V_{OUT}1, V_{OUT}2, \ldots V_{OUT}N$. In some embodiments, the regulated output voltages $V_{OUT}1, V_{OUT}2, \ldots V_{OUT}N$ comprises different voltage levels. In some embodiments, some or all of the regulated output voltages output voltages $V_{OUT}1, V_{OUT}2, \ldots V_{OUT}$-N are the same voltage level to, e.g., provide redundant DC power to certain critical electronic systems.

The central controller 120 is configured to perform various control tasks to provide centralized management and control of the operations of the DC-DC voltage converter and regulator circuits 130-1, 130-2, . . . , 130-N. In particular, the central controller 120 is configured to generate various control signals that are transmitted over the control buses 122-1, 122-2, . . . , 122-N to the respective DC-DC voltage converter and regulator circuits 130-1, 130-2, . . . , 130-N. As explained in further detail below, each control bus 122-1, 122-2, . . . , 122-N comprises multiple control lines to send control signals such as clock signals, enable signals, reset signals, programming signals, etc.

In some embodiments, each DC-DC voltage converter and regulator circuit 130-1, 130-2, . . . , 130-N comprises a programmable circuit architecture which enables the central controller 120 to independently program each DC-DC voltage converter and regulator circuit 130-1, 130-2, . . . , 130-N to convert the input DC voltage $V_{DC}$ into, e.g., any one of industry standard DC voltages including, but not limited to 12V, 5V, 3.3 V, 2.5V, 1.8V, etc. In addition, the maximum current output of each DC-DC voltage converter and regulator circuit 130-1, 130-2, . . . , 130-N can be programmatically adjusted to set a maximum output power level provided by each DC-DC voltage converter and regulator circuit 130-1, 130-2, . . . , 130-N. In some embodiments, the power management system 100 provides a maximum DC output power (e.g., 5 watts) wherein the central controller 120 is configured to distribute the maximum output DC power over the DC-DC voltage converter and regulator circuits 130-1, 130-2, . . . , 130-N (which are actively operating) so that the sum total of the maximum DC power outputs of the DC-DC voltage converter and regulator circuits 130-1, 130-2, . . . , 130-N does not exceed the maximum output DC power of the power management system 100.

In some embodiments, the central controller 120 is configured to control power-up sequencing and power-down sequencing of the DC-DC voltage converter and regulator circuits 130-1, 130-2, . . . , 130-N to comply with the, e.g., the requisite power-up and power-down sequencings of various system components of a given electronic system, which are powered using the DC output voltages $V_{OUT}1, V_{OUT}2, \ldots V_{OUT}$-N that are generated by the DC-DC voltage converter and regulator circuits 130-1, 130-2, . . . , 130-N. In addition, in some embodiments, the central controller 120 implements a voltage rail monitoring function which is configured to monitor the regulated output voltage levels which are output from the DC-DC voltage converter and regulator circuits 130-1, 130-2, . . . , 130-N to support the power-up and power-down sequencing operations, as well as to provide support for monitoring and protecting against fault conditions such as over voltage protection, over temperature protection, short circuit protection, etc.

Moreover, for systems or applications requiring a high-level DC power supply reliability, the power management system 100 can configure the DC-DC voltage converter and regulator circuits 130-1, 130-2, . . . , 130-N to provide redundant DC power supply for certain system components. For example, assume a given electronic system requires a 5V power supply for a critical system component. The power management system 100 can configure at least two of the DC-DC voltage converter and regulator circuits 130-1, 130-2, . . . , 130-N to provide a 5V DC power supply output, wherein the DC power supply outputs can be connected in parallel to enable the switching to one 5V power supply in the event of failure of the other. In this regard, for a given DC power supply that is needed by a given system, the power management system 100 can configure the DC-DC voltage converter and regulator circuits 130-1, 130-2, . . . , 130-N into a parallel output architecture with N+1 redundancy.

In some embodiments, the power management system 100 can be pre-programmed (and remain fixed) for a given application which requires multiple DC power supplies. In some embodiments, the power management system 100 is field programmable by a given user for a given application (and possibly remain fixed for a given application, until reprogrammed by a user). In some embodiments, the power management system 100 is dynamically programmable via control signals that are transmitted over the control bus 122-1 to the control bus interface 122 of the central controller 120 to enable programmatic control of the power management system 100.

In some embodiments, the central controller 120 is configured to operate in response to program control signals that are transmitted from an electronic system or device which receives DC power supply from the power management system 100. Such programmatic control enables on demand control and adjustment of the output voltages and maximum power output of the DC-DC voltage converter and regulator circuits 130-1, 130-2, . . . , 130-N to comply with power requirements of the electronic system and devices that are powered by the DC supply voltages provided by the power management system 100. For example, computerized systems or electronics which utilize the power management system 100 for multiple DC power supplies can provide control signals or feedback to the central processing unit 120 via the control bus 122-1 and control bus interface 122 to change the voltage level output and/or max power output of one or more of the DC-DC voltage converter and regulator circuits 130-1, 130-2, . . . , 130-N, as needed.

In some embodiments, the central controller 120 executes proprietary software with a unique "watch dog" function to monitor all DC voltage outputs within a given specification and provide self-diagnostics and reporting of power condition/quality, either manually or wirelessly. For example, as explained in further detail below, the central controller 120 is configured to communicate with one or more electronic systems or devices which are powered by the power management system 100 to obtain information regarding, e.g., operating characteristics of the electronic systems and devices, such as measured voltage levels, measured current levels, power usage, temperatures, etc., and other useful information to enable the power management system 100 to manage the DC power supplied to the DC power supply rails of the electronic system and devices. It is to be appreciated that the power management system 100 can be configured for use in a wide range of applications.

In some embodiments, the components 110, 120, and 130-1, . . . , 130-N of the power management system 100 comprises individual semiconductor integrated circuit (IC) dies (or semiconductor IC chips) that are packaged together with other electronic components (e.g., a processor, a system-on-chip (SoC), an ASIC, a FPGA, a digital signal processor, a memory chip, etc.) to form multi-chip modules using state of the art chip packaging techniques. In such instance, the DC-DC voltage converter and regulator circuits 130-1, 130-2, . . . , 130-N can be utilized as point-of-load DC-DC converters that are placed close to the respective loads to provide proximity to the DC supply power.

Figure 2:
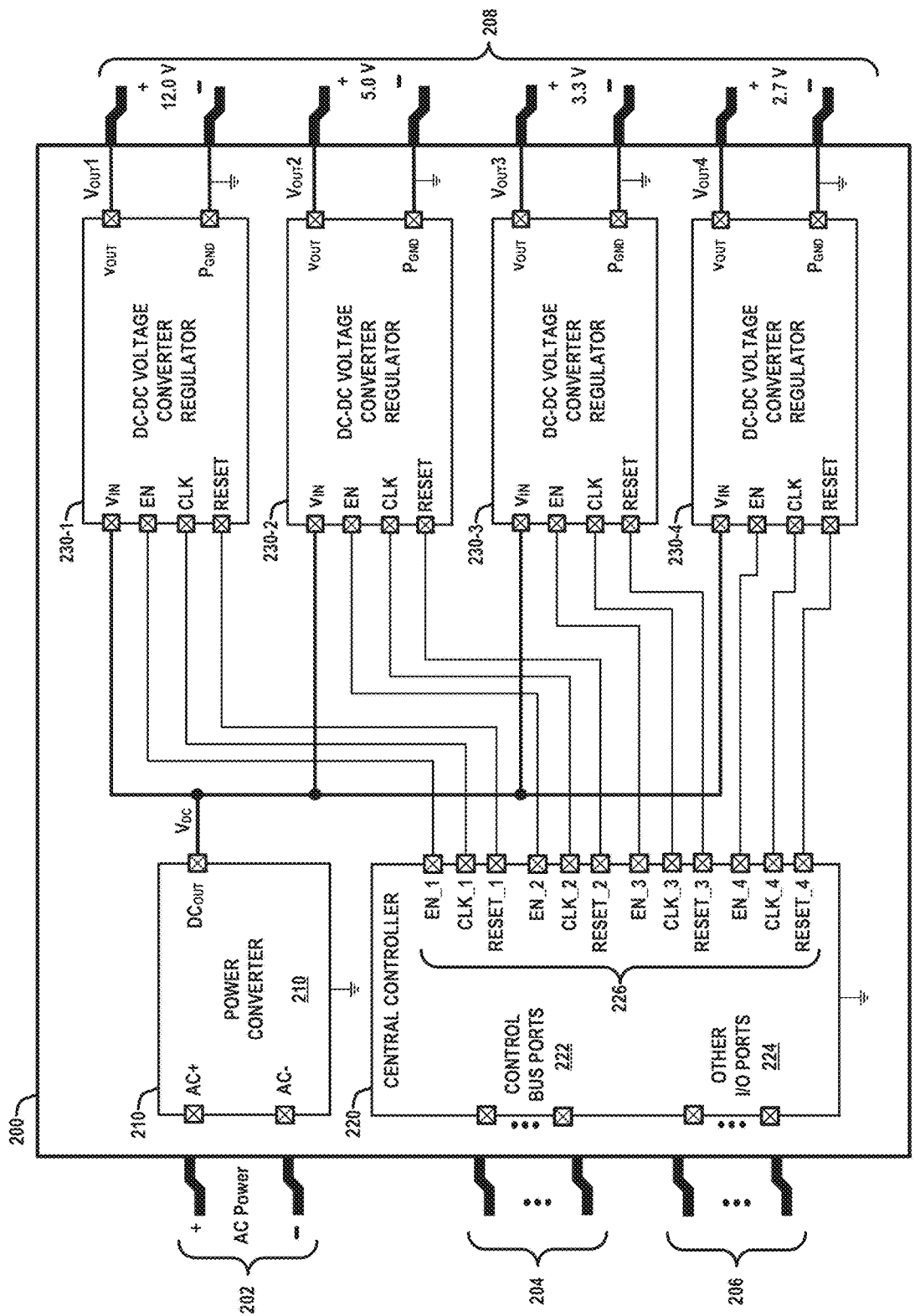
FIG. 2 schematically illustrates a multi-output programmable power management system device, according to an exemplary embodiment of the disclosure.

FIG. 2 schematically a multi-output programmable power management device, according to an exemplary embodiment of the disclosure. In particular, FIG. 2 schematically illustrates an exemplary multi-output programmable power management device 200 (alternatively referred to as power management device 200) which can be implemented as a SoC device or as a system-in-package (SIP) device. Similar to the exemplary embodiment of FIG. 1, the power management device 200 comprises a power management system comprising a power converter circuit 210, a central controller 220, and a plurality of DC-DC voltage converter and regulator circuits 230-1, 230-2, 230-3, and 230-4.

In some embodiments, for a SoC implementation, the power converter circuit 210, the central controller 220, and the plurality (N) of DC-DC voltage converter and regulator circuits 230-1, 230-2, . . . , 230-N are integrated circuits that are implemented on a single die, and the power management device 200 comprises package structure comprising, e.g., a lead frame comprising a plurality of surface-mount leads 202, 204, 206, and 208 which enable surface mounting of the power management device 200 to a substrate (e.g., printed circuit board). In other exemplary embodiments, for an SoC implementation, the power converter circuit 210, the central controller 220, and the DC-DC voltage converter and regulator circuits 230-1, 230-2, 230-3, and 230-4 can be implemented on individual dies that are mounted (e.g., flip chip mounted) to a package substrate having wire traces which connect all the dies together to implement a functional system. For a SIP implementation, instead of surface-mount leads, the power management device 200 can have an array of solder ball connections (e.g., BOA connections) on a bottom surface of the package substrate to enable direct chip bonding (e.g., flip chip bonding) of the power management device 200 to a second-level package substrate (e.g., printed circuit board or interposer).

The power converter circuit 210 comprises an AC-to-DC converter which comprises AC input nodes AC+ and AC−, and a DC output node $DC_{OUT}$. The AC input nodes AC+ and AC− are coupled to the package leads 202. The power converter circuit 210 is configured to convert AC power, which is applied to the package leads 202 (and the AC input nodes AC+ and AC−), into a DC voltage, $V_{DC}$ (e.g., $V_{DC}$=12 V or greater) which is distributed to an voltage input port $V_{IN}$ of each DC-DC voltage converter and regulator circuit 230-1, 230-2, 230-3, and 230-4.

In some embodiments, as shown in FIG. 2, the central controller 220 comprises a plurality of ports (or nodes) including control bus ports 222, other I/O ports 224, and a plurality of control ports 226. The control bus ports 222 are coupled to respective ones of the package leads 204. The I/O ports 224 are coupled to respective ones of the package leads 206. The control ports 226 are configured to output control signals that are applied to the respective DC-DC voltage converter and regulator circuits 230-1, 230-2, 230-3, and 230-4 for controlling operations of the DC-DC voltage converter and regulator circuits 230-1, 230-2, 230-3, and 230-4.

For example, the control ports 226 comprise enable output ports EN_1, EN_2, EN_3, and EN_4 which are coupled to respective enable input ports EN of the DC-DC voltage converter and regulator circuits 230-1, 230-2, 230-3, and 230-4. In addition, the control ports 226 comprise clock signal output ports CLK_1, CLK_2, CLK_3, and CLK_4 which are coupled to respective clock signal input ports CLK of the DC-DC voltage converter and regulator circuits 230-1, 230-2, 230-3, and 230-4. Moreover, the control ports 226 comprise reset signal output ports RESET_1, RESET_2, RESET_3, and RESET_4 which are coupled to respective reset signal input ports RESET of the DC-DC voltage converter and regulator circuits 230-1, 230-2, 230-3, and 230-4.

As further shown in FIG. 2, each DC-DC voltage converter and regulator circuit 230-1, 230-2, 230-3, and 230-4 comprises a respective voltage output port $V_{OUT}$ and a respective power ground port $P_{GND}$, which are couple to respective ones of the package leads 208. In some embodiments, as noted above, DC-DC voltage converter and regulator circuits 230-1, 230-2, 230-3, and 230-4 comprise DC-DC step-down voltage switching regulator circuits (e.g., a Buck switching regulator) which are configured to convert the DC voltage $V_{DC}$ applied to the input voltage port $V_{IN}$ to a respective regulated output voltage $V_{OUT}1$, $V_{OUT}2$, $V_{OUT}3$, and $V_{OUT}4$. FIG. 2 schematically illustrates an exemplary non-limiting embodiment of the power management device 200 having four DC-DC voltage converter and regulator circuits 230-1, 230-2, 230-3, and 230-4, which are shown to be configured to generate regulated DC output voltages of $V_{OUT}1$=12V, $V_{OUT}2$=5.0V, $V_{OUT}3$=3.3V, and $V_{OUT}4$=2.7 V, respectively. However, it is to be understood that such voltage output levels are merely exemplary, and that some or all of the DC-DC voltage converter and regulator circuits 230-1, 230-2, 230-3, and 230-4 can be programmed to output other regulated voltage levels. In addition, as noted above, two or more of the DC-DC voltage converter and regulator circuits 230-1, 230-2, 230-3, and 230-4 can be programmed to output the same regulated voltage level, which can be applied to different electronic system components or devices, or to the same component or device to provide redundancy in the case of failure of one of the DC-DC voltage converter and regulator circuits 230-1, 230-2, 230-3, and 230-4.

The DC-DC voltage converter and regulator circuits 230-1, 230-2, 230-3, and 230-4 can implement any suitable DC-DC step-down voltage switching regulator circuit architecture which is suitable for the given application. In some embodiments, the DC-DC voltage converter and regulator circuits 230-1, 230-2, 230-3, and 230-4 have the same or substantially the same circuit architecture, such as shown in FIG. 2, but which are controllable and programmable by the central controller 220 to generate different regulated output voltages, as desired, based on the same DC input voltage $V_{DC}$ that is generated an output from the power converter circuit 210. For example, as schematically illustrated in FIG. 2, the enable input ports EN of the DC-DC voltage converter and regulator circuits 230-1, 230-2, 230-3, and 230-4 are configured to receive respective enable control signals EN_1, EN_2, EN_3, and EN_4, which allow the central controller 220 to enable or disable the DC-DC voltage converter and regulator circuits 230-1, 230-2, 230-3, and 230-4, as needed. For example, the central controller 220 can disable one or more of the DC-DC voltage converter and regulator circuits 230-1, 230-2, 230-3, and 230-4 which are not utilized at some given time to generate a regulated DC supply voltage for a given electronic system. In addition, the central controller 220 can disable a given one of the DC-DC voltage converter and regulator circuits 230-1, 230-2, 230-3, and 230-4, as needed, to protect against a detected fault condition, etc.

The reset input ports RESET of the DC-DC voltage converter and regulator circuits 230-1, 230-2, 230-3, and 230-4 are configured to receive respective reset signals RESET_1, RESET_2, RESET_3, and RESET_4, which allows the central controller 220 to hold one or more of the DC-DC voltage converter and regulator circuits 230-1, 230-2, 230-3, and 230-4 in a reset state, as needed, when performing certain functions such as power-up sequencing, etc. Furthermore, the clock signal input ports CLK of the DC-DC voltage converter and regulator circuits 230-1, 230-2, 230-3, and 230-4 are configured to receive respective clock signals CLK_1, CLK_2, CLK_3, and CLK_4, which allows the central controller 220 to programmatically control and adjust the level of regulated DC voltage and/or output power of the DC-DC voltage converter and regulator circuits 230-1, 230-2, 230-3, and 230-4 using known techniques. For example, the level of regulated DC voltage and/or output power of a given DC-DC voltage converter and regulator circuit can be adjusted by varying the clock frequency and/or duty cycle of the clock signal CLK, which modulates the on/off time of one or more internal switches of the DC-DC voltage converter and regulator circuit, and which, allows the regulated output to be adjusted to a target voltage level within a given range.

In some embodiments, the control bus and control bus interface of the central controller 220 can be implemented using a serial peripheral interface (SPI) communication interface to enable communication between the central processing unit 220 and other components of a given system which is coupled to the power management system 200 to control the power management device 200 or and/or which utilizes the DC supply voltages that are generated and managed by the power management device 200. As is known in the art, SPI is a synchronous, full duplex master-slave-based interface. Both master and slave can transmit data at the same time. The SPI interface comprises a 4-wire interface. 4-wire SPI devices have four signals: Clock (CLK), Chip select (CS) Master out, slave in (MOSI), and Master in, slave out (MISO), the details of which are known to those of ordinary skill in the art. In such instance, the number of control bus ports 222 and associated package leads 204 will be at least 4 for the SPI communication protocol. In other embodiments, the control bus and control bus interface of the central controller 220 can be implemented using the Power Management Bus (PMBus) communication protocol As is known in the art, PMBus is an open-standard digital power management protocol which enables communication between components of a power system such as CPUs, power supplies, power converters, etc. In some embodiments, the other I/O ports 224 are utilized to receive input signals to support other functions of the central controller 220, as needed.

Figure 3:
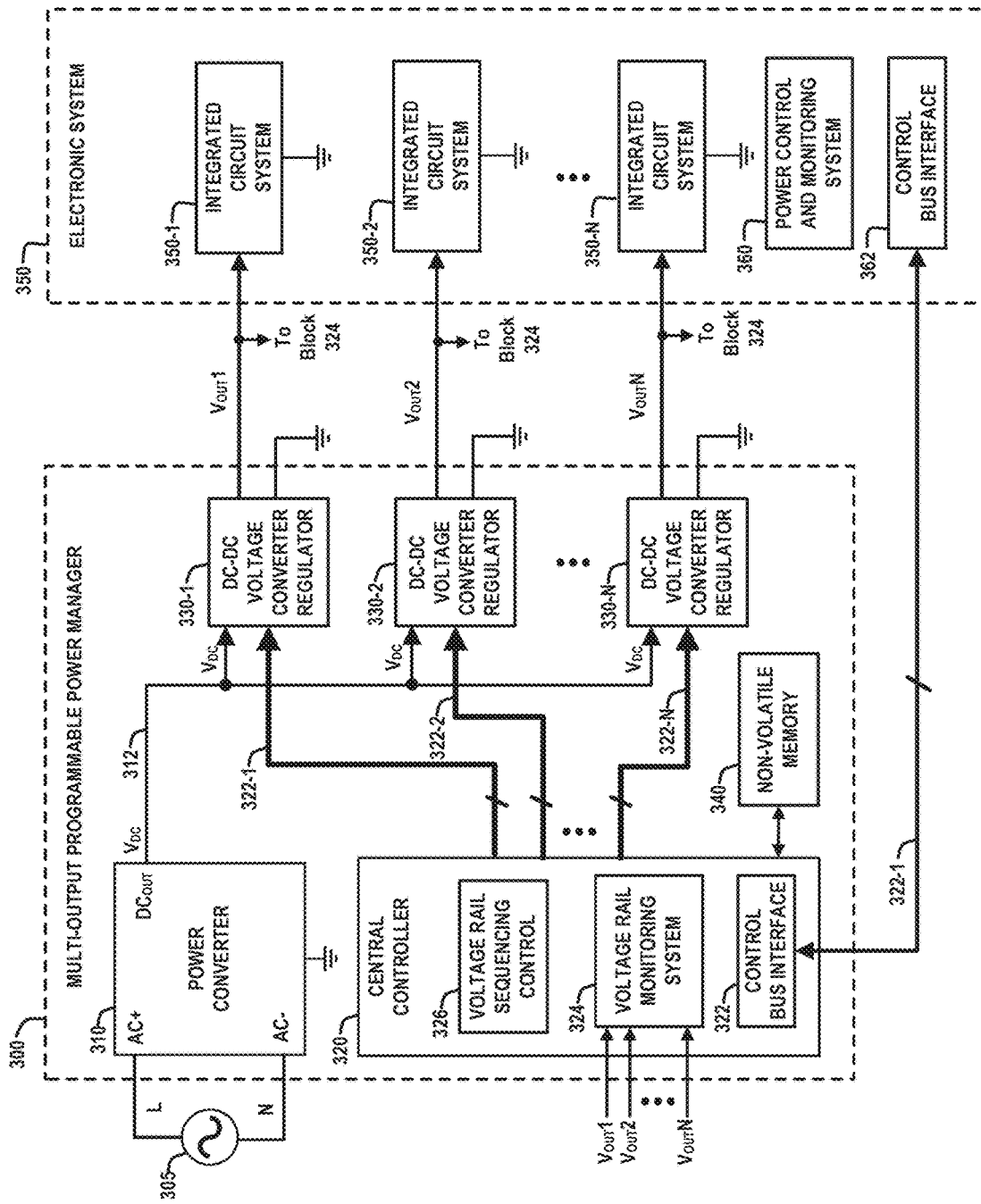
FIG. 3 schematically illustrates a system which implements a multi-output programmable power management system, according to an exemplary embodiment of the disclosure.

FIG. 3 schematically illustrates a system which implements a multi-output programmable power management system, according to an exemplary embodiment of the disclosure. More specifically, FIG. 3 schematically illustrates a system comprising a multi-output programmable power management system 300 (alternatively referred to as power management system 300) and an electronic system 350. The power management system 300 comprises a power converter circuit 310, a central controller 320, a plurality of DC-DC voltage converter and regulator circuits 330-1, 330-2, ..., 330-N, and a non-volatile memory 340 (e.g., Flash memory). Similar to the exemplary embodiments described above, the power converter circuit 310 is configured to cover AC power of an AC power source 305 into a DC voltage, $V_{DC}$, which is distributed to a voltage input port $V_{IN}$ of each DC-DC voltage converter and regulator circuit 330-1, 330-2, ..., 330-N over a voltage bus 312.

The central controller 320 is configured to perform various control tasks to provide centralized management and control of the operations of the DC-DC voltage converter and regulator circuits 330-1, 330-2, ..., 330-N. The central controller 320 comprises a control bus interface 322 coupled to a control bus 322-1, a voltage rail monitoring system 423, and a voltage rail sequencing control module 326. The non-volatile memory 340 stores program code that is executed by the central controller 320 to implement various functions such as the monitoring and sequencing functions of the modules 324 and 326. The central controller 320 is configured to generate various control signals that are transmitted over control buses 322-1, 322-2, ..., 322-N to the respective DC-DC voltage converter and regulator circuits 330-1, 330-2, ..., 330-N.

The electronic system 350 comprises a plurality of integrated circuit systems 350-1, 350-2, ..., 350-N, which receive respective regulated voltages $V_{OUT}1, V_{OUT}2, ..., V_{OUT}N$ from the respective DC-DC voltage converter and regulator circuits 330-1, 330-2, ..., 330-N. In some embodiments, the electronic system 350 may comprise a CPU, DSP, ASIC, or a DSP device wherein the integrated circuit systems 350-1, 350-2, ..., 350-N comprise different circuit components of such devices (e.g., processing cores, I/O circuitry, etc.). In other embodiments, the electronic system 350 may comprise an electronic device or system such as computer, display device, etc., wherein the integrated circuit systems 350-1, 350-2, ..., 350-N comprise different integrated circuit chips or system components of the electronic system 350. In some embodiments, the electronic system 350 comprises a power control and monitoring system 360 which is configured to monitor power usage of the integrated circuit systems 350-1, 350-2, ..., 350-N and send commands to the central controller 320 via a local control bus interface 352 to request adjustment of voltage levels or power levels of the respective regulated voltages $V_{OUT}1, V_{OUT}2, \ldots, V_{OUT}N$ that are supplied to the power the integrated circuit systems 350-1, 350-2, ..., 350-N, as needed.

In some embodiments, the voltage rail monitoring system 324 is configured to monitor the voltage levels of the respective regulated voltages $V_{OUT}1, V_{OUT}2, \ldots, V_{OUT}N$ that are output from the respective DC-DC voltage converter and regulator circuits 330-1, 330-2, ..., 330-N to ensure that the voltage levels are at the expected levels. As schematically shown in FIG. 3, a feedback system is implemented in which the respective regulated voltages $V_{OUT}1, V_{OUT}2, \ldots, V_{OUT}N$ that are output from the respective DC-DC voltage converter and regulator circuits 330-1, 330-2, ..., 330-N are input to the voltage rail monitoring system 324 to track and monitor the voltage levels.

The voltage rail sequencing control module 326 is configured to control power-up sequencing and power-down sequencing of the DC-DC voltage converter and regulator circuits 330-1, 330-2, ..., 330-N to comply with the, e.g., the requisite power-up and power-down sequencing of the integrated circuit systems 350-1, 350-2, ..., 350-N of the electronic system. For example, a FGPA may require that a core supply voltage must be applied a certain amount of time prior to applying supply voltage to I/O circuitry to avoid damaging the device upon power up.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a power converter circuit configured to convert an alternating current (AC) voltage to a direct current (DC) voltage;
   a plurality of DC-DC converter circuits, wherein the DC-DC converter circuits are configured to convert the DC voltage output from the power converter circuit into respective regulated DC voltages which are independent from each other; and
   a controller configured to control and program operations of the DC-DC converter circuits, wherein the controller is configured to:
   monitor a DC output voltage of each of the plurality of DC-DC converter circuits; and
   automatically set a maximum current output of one or more of the plurality of DC-DC converter circuits to adjust an output power of the one or more of the plurality of DC-DC converter circuits such that a total DC output power of the plurality of DC-DC converter circuits does not exceed a maximum DC output power threshold; and
   wherein the controller comprises a control interface that is configured to receive one or more programming control commands from an electronic system which is powered by the regulated DC voltages of at least two of the DC-DC converter circuits, and wherein the controller configures the at least two DC-DC converter circuits to adjust the regulated DC voltages that are independently generated by the at least two DC-DC converter circuits, based at least in part on the one or more programming control commands from the electronic system.

2. The system of claim 1, wherein the regulated DC voltages of at least two of the DC-DC converter circuits comprise different voltage levels.

3. The system of claim 1, wherein the regulated DC voltages of at least two of the DC-DC converter circuits comprise a same voltage level.

4. The system of claim 1, wherein the controller is configured to control sequential activation and sequential deactivation of the DC-DC converter circuits.

5. The system of claim 4, wherein:
   at least one DC-DC converter circuit comprises a programmable DC-DC converter circuit; and
   the controller is configured to program the programmable DC-DC converter circuit to at least one of (i) adjust a magnitude of the regulated DC voltage generated by the programmable DC-DC converter circuit, and (ii) adjust a maximum power output of the DC-DC converter circuit.

6. The system of claim 1, wherein the controller is configured to monitor the regulated DC voltages output from the DC-DC converter circuits to determine whether the regulated DC voltages output from the DC-DC converter circuits are at proper voltage levels.

7. The system of claim 1, wherein the control interface is configured to enable user programmatic control of the DC-DC converter circuits.

8. The system of claim 7, wherein the control interface comprises a serial peripheral interface protocol.

9. The system of claim 1, wherein the one or more programming control commands from the electronic system cause the controller to adjust at least one of a regulated DC voltage level and a DC power output level supplied by the at least two DC-DC converter circuits.

10. The system of claim 1, wherein the system comprises a multi-chip module in which the power converter circuit, the plurality of DC-DC converter circuits, and the controller comprises integrated circuit dies that are packaged together.

* * * * *